Patented June 4, 1929.

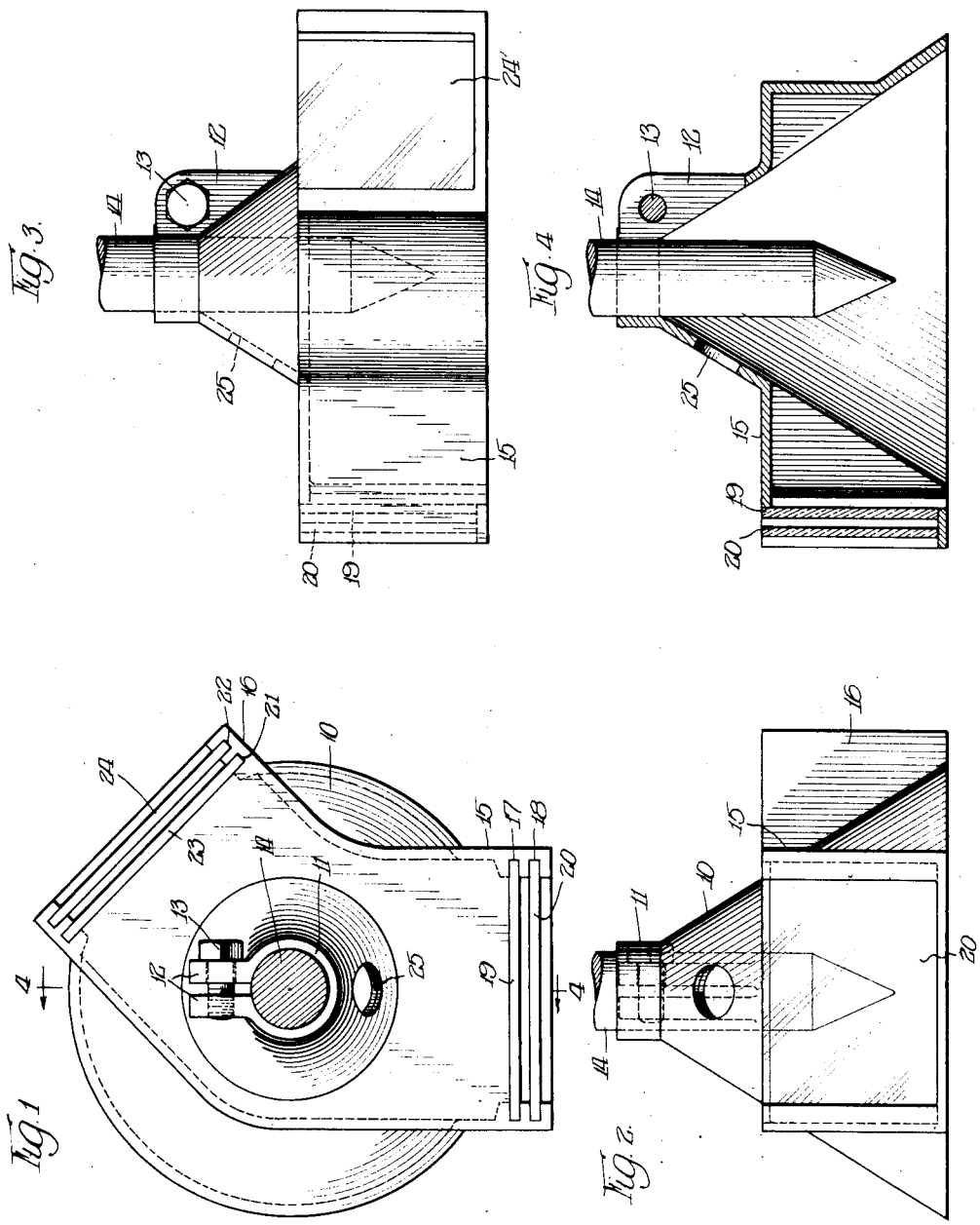

1,716,096

UNITED STATES PATENT OFFICE.

RAY B. WEEKS, OF CLEVELAND, OHIO, ASSIGNOR, BY MESNE ASSIGNMENTS, TO THE WAYNE PUMP COMPANY, OF BALTIMORE, MARYLAND, A CORPORATION OF MARYLAND.

GLARE SHIELD FOR ELECTRIC WELDING.

Application filed May 18, 1927. Serial No. 192,462.

The invention pertains to welding shields, and more particularly to a novel glare shield adapted to be applied to and surround a welding tool and be movable therewith.

An object of the invention is to provide a novel glare shield adapted to surround and be fastened to a welding tool so that the operator may be free to operate said tool.

Another object is to provide a glare shield having a plurality of removable windows for viewing the welding operation from different angles.

Still another object is to provide a glare shield having a plurality of windows, each provided with a plurality of lenses, an opaque lens and a protecting transparent lens disposed between the opaque lens and the welding tool.

A further object is to provide a glare shield surrounding a welding tool and having a draw-off connection in the top of said shield for exhausting the gases generated from the welding operation.

With these and various other objects in view, the invention may consist of certain novel features of construction and operation as will be more fully described and particularly pointed out in the specification, drawings and claims appended hereto.

In the drawings, which illustrate an embodiment of the device and wherein like reference characters are used to designate like parts:—

Figure 1 is a plan view of the glare shield;

Figure 2 is an elevation of Figure 1 looking in the direction of the lens 20;

Figure 3 is an elevation of Figure 1 looking at the shield from the right thereof; and Figure 4 is an elevation partly in section taken substantially on the plane as indicated by the line 4—4 of Figure 1.

It is contemplated to make a shield which is adapted to be fastened to a welding tool and which may be particularly applied to a welding machine, such as disclosed in my co-pending case, Serial No. 189,123, filed May 5, 1927, but it will be understood that this shield may be conveniently used on any welding tool at all, such as a hand tool of the electric arc, gas or other type.

It will be seen that the body of the shield 10 is substantially conical in shape, terminating at its vertex in a split collar 11 provided with ears 12, one of which is threaded for the reception of a clamping bolt 13 and the other of which forms a bearing for the head of said bolt. This bolt forms the means to fixedly position the shield with respect to a welding tool represented at 14. This shield is provided with window tunnels or supporting means 15 and 16, preferably disposed at an angle of 135° to each other. These tunnels have inner grooves 17 and 21 respectively and outer grooves 18 and 22 respectively provided at their outer extremities. The inner grooves are adapted to receive any inexpensive transparent glasses 19 and 23 which form protecting means for the more expensive colored or substantially opaque lenses 20 and 24 respectively, which lenses are of course necessary to view the arc formed during the welding operation. Disposed adjacent the top of the conical shield is a threaded plug adapted to be removed from the hole 25 for the application of an exhaust means to said shield.

In applying this shield to the welding tool, it is only necessary to slip the tool into the collar 11 and tighten the bolt 13. It has often been desirable or necessary for more than one operator to view the welding operation or for an operator to view the welding operation from different angles, and it is for this purpose that the angularly disposed window tunnels 15 and 16 have been provided. It is of course readily understood that the inexpensive inner glasses 19 and 23 will provide a protection for the more expensive outer glasses 20 and 24, which protection is highly desirable because in welding operation there is always danger of the glasses becoming pitted from the flying sparks given off in the welding operation. It will be readily understood that due to the glasses being positioned in the slots provided therefor that when the inner glass becomes pitted or spoiled, it is only necessary to remove said glass and substitute a new one therefor.

It is also well known that in welding processes, a smoky gas is given off from the intensity of the heat of the arc. This gas of course rises toward the vertex of the cone of the shield and it is for this purpose that the exhaust means 25 is provided to readily exhaust this gas and keep the inside of the cone clear, thereby preventing obscurity of vision.

It is to be understood that I do not wish to be limited by the exact embodiment shown as other and various embodiments of this invention will of course be apparent to those skilled in the art.

I claim:

1. In a device of the character described, the combination of a conical shield adapted to be fastened to a welding tool, an adjustable collar located at the apex of said shield for fastening said shield to said tool, means in said shield for attachment to an exhaust means, and windows in said shield.

2. In a device of the character described, the combination of a conical shield adapted to be fastened to a welding tool, an adjustable collar on said shield for fastening said shield to said tool, a plurality of openings in said shield, each of said openings having removable means for viewing the welding operation, and removable protecting means disposed between said first named removable means and the tool.

3. In a device of the character described, the combination of a conical shield adapted to be fastened to a welding tool, an adjustable collar located at the vertex of said shield for fastening said shield to said tool, means in said shield for attachment to an exhaust means, removable means for viewing the welding operation, and removable protecting means disposed between said first named removable means and the tool.

4. In a device of the character described, the combination of a conical shield adapted to be fastened to a welding tool, an adjustable collar for fastening said shield to said tool, a plurality of openings in said shield, each of said openings having a removable substantially opaque lens for viewing the welding operation, and a removable protecting transparent lens disposed between said opaque lens and said tool.

5. In a device of the character described, the combination of a substantially conical casing having adjustable tool securing means located adjacent the apex thereof, a visual tunnel formed in said casing having angularly disposed portions for multidirectionally viewing the operation of said tool.

6. In a device of the character described, the combination of a substantially conical casing having adjustable tool securing means located adjacent the apex thereof, a visual tunnel formed in said casing having angularly disposed portions for multidirectionally viewing the operation of said tool, the ends of said tunnel each being provided with slots for the reception of means for permitting viewing of the operation of said tool and for the reception of means for guarding said last mentioned means.

7. In a device of the character described, the combination of a substantially conical casing having an adjustable tool securing collar located adjacent the apex thereof, a visual tunnel formed in said casing having angularly disposed portions for multidirectionally viewing the operation of said tool, the ends of said tunnel each being provided with open topped slots, one slot removably supporting transparent means for permitting viewing of the operation of said tool and another of said slots removably supporting transparent guard means between said tool and said transparent means for preventing damage to said transparent means during operation of said tool.

8. In a device of the character described, the combination of a substantially conical casing having an adjustable tool securing collar located adjacent the apex thereof and adapted to position the tool symmetrically with respect to the conical casing and in such a manner that the end of said tool will be within said casing, a visual tunnel formed in said casing having angularly disposed portions for multidirectionally viewing the operation of said tool, the ends of said tunnel each being provided with open topped slots, one slot removably supporting transparent means for permitting viewing of the operation of said tool and another of said slots removably supporting transparent guard means between said tool and said transparent means for preventing damage to said transparent means during operation of said tool.

Signed at Cleveland, Ohio, this 13th day of May, 1927.

RAY B. WEEKS.